United States Patent [19]

Kanbara

[11] Patent Number: 5,252,972
[45] Date of Patent: Oct. 12, 1993

[54] CODEC HAVING CONTROLLABLE FRAME SYNCHRONIZING AND CLOCKING SIGNALS

[75] Inventor: Satoshi Kanbara, Kanagawa, Japan

[73] Assignee: NEC Corporation, Japan

[21] Appl. No.: 823,284

[22] Filed: Jan. 21, 1992

[30] Foreign Application Priority Data

Jan. 22, 1991 [JP] Japan .................................. 3-022761

[51] Int. Cl.⁵ ............................................. H03M 1/02
[52] U.S. Cl. .................................................. 341/108
[58] Field of Search ............... 341/108, 110, 122, 144, 341/155; 375/26; 370/100.1, 105.1

[56] References Cited

U.S. PATENT DOCUMENTS

| | | | |
|---|---|---|---|
| 4,160,243 | 7/1979 | Moriya et al. | 341/108 |
| 4,348,768 | 9/1982 | Svala | 375/26 |
| 5,127,023 | 6/1992 | Tash et al. | 375/55 |

Primary Examiner—A. D. Pellinen
Assistant Examiner—Brian Young
Attorney, Agent, or Firm—Laff, Whitesel, Conte & Saret

[57] ABSTRACT

A codec comprises a control circuit for generating a frame synchronous signal and a clock signal which are controlled to comply with different types of data carried on a received digital signal to be converted to a received analog signal in a decoder and data carried on a transmitting digital signal converted from a transmitting analog signal.

2 Claims, 5 Drawing Sheets

CODEC HAVING CONTROLLABLE FRAME SYNCHRONIZING AND CLOCKING SIGNALS

FIELD OF THE INVENTION

The invention relates to a codec including an encoder and a decoder, and more particularly to, a codec well adapted to the processing of digital signals distributed on a time axis.

BACKGROUND OF THE INVENTION

A conventional codec comprises a decoder for converting a received digital signal to a received analog signal, and an encoder for converting a transmitting analog signal to a transmitting digital signal.

In operation, when a rising edge of a frame synchronous signal is detected, the transmitting analog signal is converted in the encoder to the transmitting digital signal having a predetermined number of bits, such that each bit is synchronous with a rising edge of each clock signal, and the received digital signal having the predetermined number of bits is converted in the decoder to the received analog signal, such that each bit of the received digital signal is synchronous with a falling edge of each clock signal.

However, the conventional codec has a disadvantage in that a significant amount of data which is processed in one frame is small, because the signal conversion is carried out only for the digital signal of the predetermined number of bits, and for the analog signal of a length corresponding to the predetermined number of bits, after the detection of the rising edge of the frame synchronous signal.

The conventional codec has a further disadvantage in that another set of an encoder and a decoder are required in conducting the signal conversion with a conversion rate which is different from the conversion rate of one bit per one clock.

SUMMARY OF THE INVENTION

Accordingly, it is an object of the invention to provide a codec in which an increased amount of data is processed in one frame.

It is a further object of the invention to provide a codec in which a single set of an encoder and a decoder are only required to process analog and digital signals having different conversion rates.

According to the invention, a codec, comprises:

a decoder for converting a received digital signal to a received analog signal in synchronism with a frame synchronous signal and a clock signal;

an encoder for converting a transmitting analog signal to a transmitting digital signal in synchronism with the frame synchronous signal and the clock signal; and means for controlling the decoder and the encoder to carry out conversion between digital and analog signals by supplying the frame synchronous signal and the clock signal thereto;

wherein the controlling means controls at least one of the frame synchronous signal and the clock signal to comply with a timing and/or a length of data carried on the received and transmitting digital signals.

BRIEF DESCRIPTION OF THE DRAWINGS

The invention will be explained in more detail in conjunction with appended drawings, wherein.

DESCRIPTION OF THE PREFERRED EMBODIMENT

Figure 1:
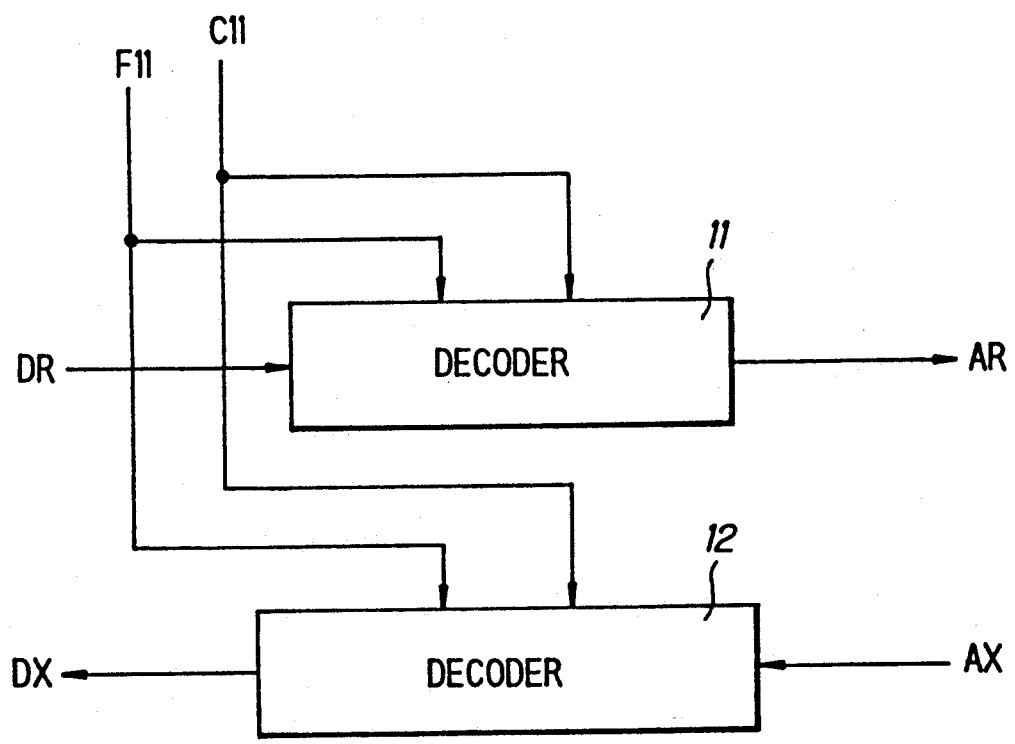
FIG. 1 is a block diagram showing a conventional codec.

Before explaining a codec of a preferred embodiment according to the invention, the aforementioned conventional codec will be explained in FIG. 1.

The conventional codec comprises a decoder 11 for converting a received digital signal of eight bits DR to a received analog signal AR in synchronism with a falling edge of each clock signal C11 after a rising edge of a frame synchronous signal F11, and an encoder 12 for converting a transmitting analog signal AX to a transmitting digital signal of eight bits DX in synchronism with a rising edge of each clock signal C11 after the rising edge of the frame synchronous signal F11.

Figure 2:
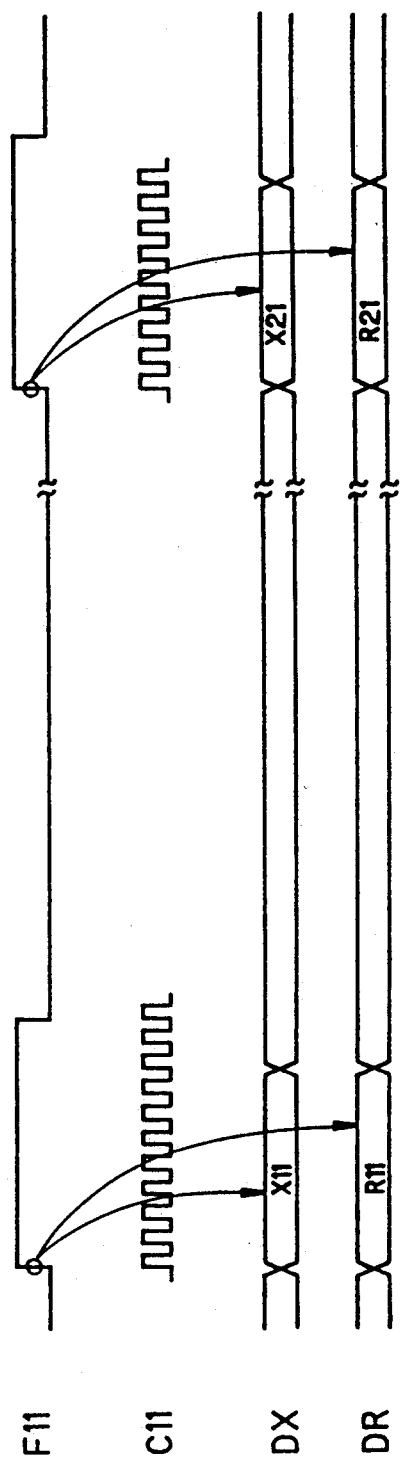
FIG. 2 is a timing chart showing a first operation of the conventional codec as shown in FIG. 1.

FIG. 2 shows a first operation of the conventional codec. In this first operation, when the rising edge of the frame synchronous signal F11 is detected, the decoder 11 starts the digital to analog conversion of the received digital signal DR to provide the received analog signal AR, and the encoder 12 starts the analog to digital conversion of the transmitting analog signal AX to provide the transmitting digital signal DX. In the decoder 11, the received digital signal DR of eight bits is converted in synchronism with the falling edge of the clock signal C11 to the received analog signal AR by a conversion rate of one bit per one clock. This conversion is repeated each time of detecting the rising edge of the frame synchronous signal F11. In the encoder 12, the transmitting analog signal AX is converted to the transmitting digital signal DX of eight bits, such that each bit of the transmitting digital signal DX is synchronous with the rising edge of the clock signal C11 by a conversion rate of one bit per one clock. The conversion is repeated each time of detecting the rising edge of the frame synchronous signal F11. Consequently, the received digital signal of eight bits DR including data R11, R21, ..... which is received from a transmission line is converted to the received analog signal AR, and the transmitting analog signal AX is converted to the transmitting digital signal DX including data X11, X21, ..... which will be transmitted through a transmission line.

Figure 3:
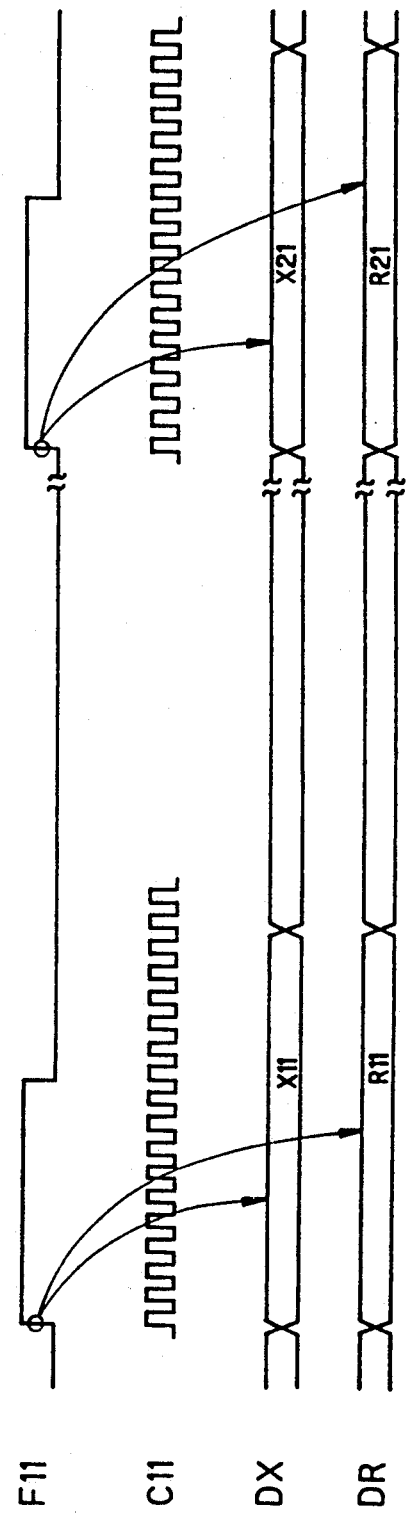
FIG. 3 is a timing chart showing a second operation of the conventional codec as shown in FIG. 1.

FIG. 3 shows a second operation of the conventional codec. The basic principle of the second operation is the same as that of the first operation. In the second operation, however, a conversion rate is one bit per two clocks. For the difference of the conversion rate, two sets of decoders and encoders are required in conducting the first and second operations in the conventional codec.

Figure 4:
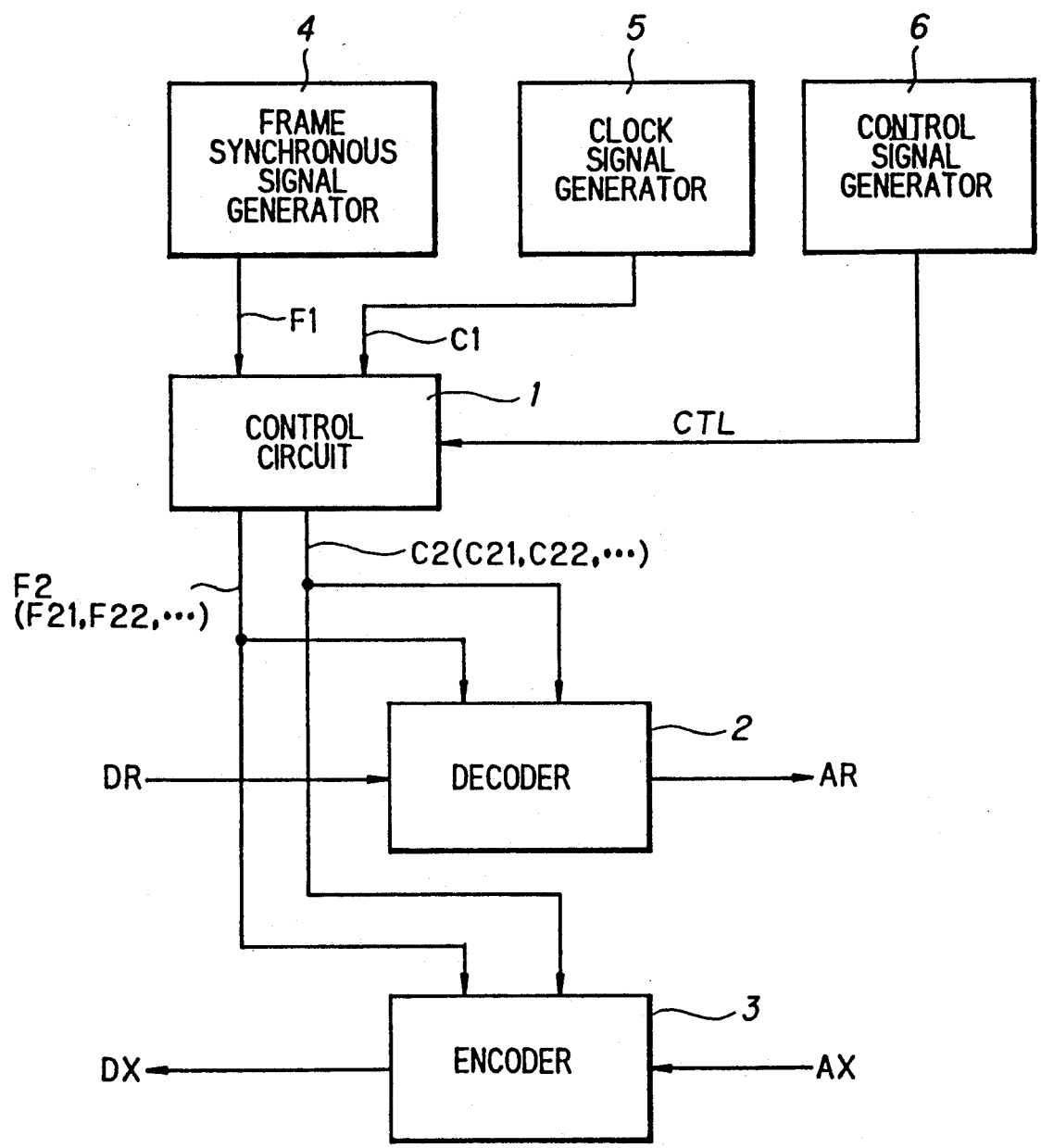
FIG. 4 is a block diagram showing a codec of a preferred embodiment according to the invention.

Next, a codec of a preferred embodiment according to the invention will be explained in FIG. 4.

The codec comprises a control circuit 1 for generating a frame synchronous signal F2 and a clock signal C2 which are dependent on data types of received and transmitting digital signals by receiving an external frame synchronous signal F1 supplied from a frame synchronous signal generator 4, an external clock signal C1 supplied from a clock signal generator 5, and a control signal CTL supplied from a control signal generator 6, a decoder 2 for converting a received digital signal DR to a received analog signal AR in accordance with the frame synchronous signal F2 and the clock signal C2 supplied from the control circuit 1, and an encoder 3 for converting a transmitting analog signal AX to a transmitting digital signal DX in accordance with the frame synchronous signal F2 and the clock signal C2. In the control circuit 1, the external frame synchronous signal F1 and the external clock signal C1 are converted to the frame synchronous signal F2 and the clock signal C2 complying with the types of the received and transmitting digital signals DR and DX in accordance with the control signal CTL.

Figure 5:
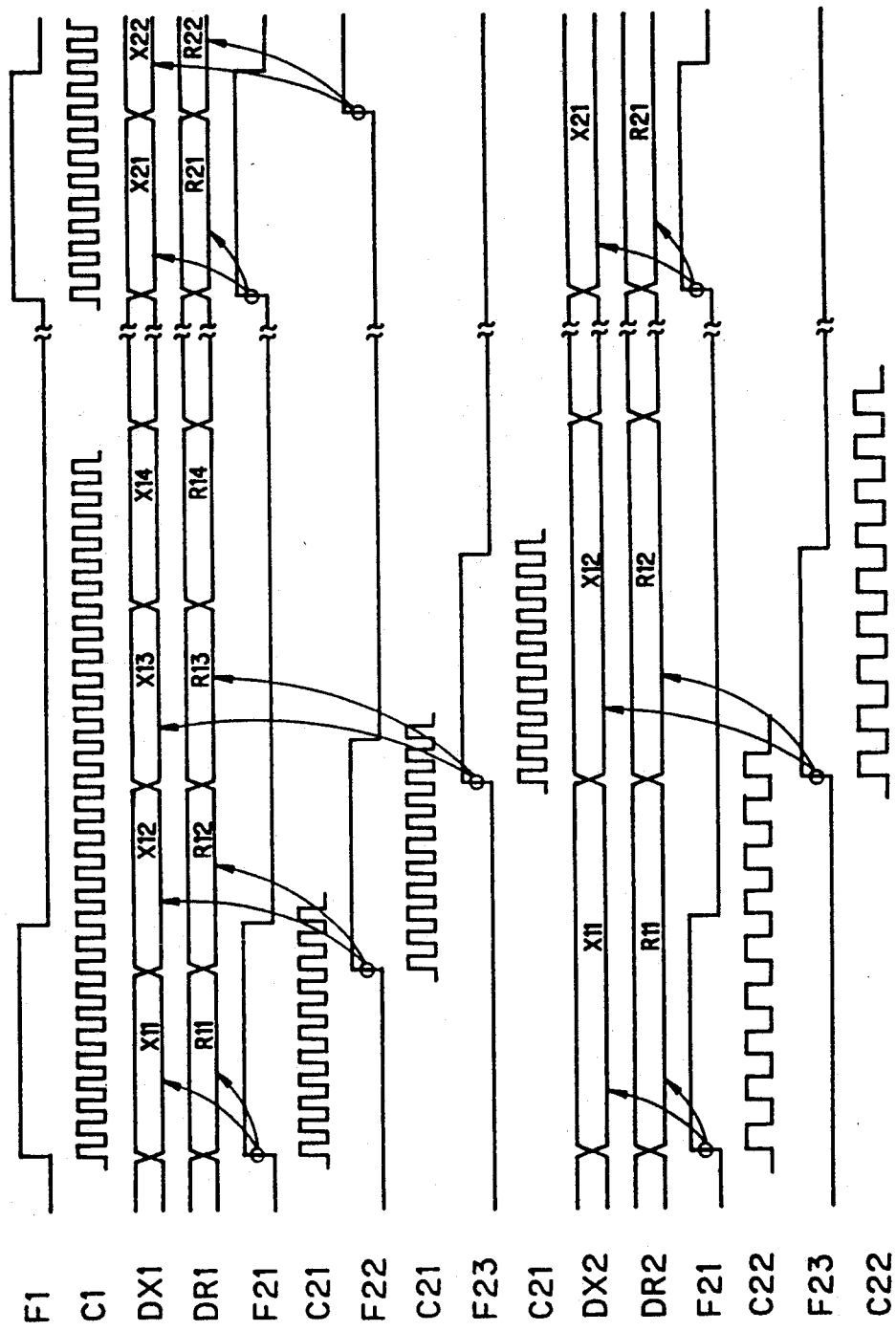
FIG. 5 is a timing chart showing operation of the codec of the preferred embodiment according to the invention.

FIG. 5 shows operation of the codec of the preferred embodiment, in which the first type of a received digital signal DR1 and a transmitting digital signal DX1, and the second type of a received digital signal DR2 and a transmitting digital signal DX2 are processed.

First, it is assumed that a first control signal CTL corresponding to the first type of the received and transmitting digital signals DR1 and DX1 including data R11, R12, ..... and X11, X12, ....., respectively, is supplied to the control circuit 1, so that a frame synchronous signal F21 and a clock signal C21 both corresponding to the first type digital signals DR1 and DX1 are supplied from the control circuit 1 to the decoder 2 and the encoder 3. In the decoder 2, the received digital signal DR1 of eight bits including data R11, R21, ..... are converted in synchronism with the falling edge of the clock signal C21 after the detection of the rising edge of the frame synchronous signal F21 to the received analog signal AR by a conversion rate of one bit per one clock, and, in the encoder 3, the transmitting analog signal AX is converted to the transmitting digital signal DX1 of eight bits including data X11, X21, in synchronism with the rising edge of the clock signal C21 after the detection of the rising edge of the frame synchronous signal F21 by a conversion rate of one bit per one clock. Consequently, the transmitting digital signal DX1 including data X11, X21, ....., to which the transmitting analog signal AX is converted, is transmitted through a transmission line, and the received analog signal AR is obtained from the received digital signal DR1 including data R11, R21, ..... which is received from a transmission line.

Then, the frame synchronous signal F22 and the unchanged clock signal C21 are supplied from the control circuit 1 to the decoder 2 and the encoder 3, so that the received digital signal DR1 including data R12, R22, ..... is converted in the same manner as above to the received analog signal AR, and the transmitting analog signal AX is converted in the same manner as above to the transmitting digital signal DX1 including data X12, X22 ..... .

In the same manner, the frame synchronous signals F23, F24, ..... and the unchanged clock signal C21 are supplied from the control circuit 1 to the decoder 2 and the encoder 3 at predetermined timings as understood from FIG. 5, so that data X13, X14, ..... of the transmitting digital signal DX1 and data R13, R14, .... of the received digital signal DR1 are processed as explained above.

Second, it is assumed that a second control signal CTL corresponding to the second type of the received and transmitting digital signals DR2 and DX2 including data R11, R12, ..... and X11, X12, respectively, is supplied to the control circuit 1, so that the frame synchronous signal F21 and a clock signal C22 both corresponding to the second type digital signals DR2 and DX2 are supplied from the control circuit 1 to the decoder 2 and the encoder 3, wherein the clock signal C22 is of a frequency obtained by dividing the frequency of the clock signal C21 by two, and of a pulse width obtained by multiplying the pulse width of the clock signal C21 by two, so that one clock of the clock signal C22 is equal to two clocks of the clock signal C21. In the decoder 2, the received digital signal DR2 of eight bits including data R11, R21, are converted in synchronism with the falling edge of the clock signal C22 after the detection of the rising edge of the frame synchronous signal F21 to the received analog signal AR by a conversion rate of one bit per one clock, and, in the encoder 3, the transmitting analog signal AX is converted to the transmitting digital signal DX2 of eight bits including data X11, X21, in synchronism with the rising edge of the clock signal C22 after the detection of the rising edge of the frame synchronous signal F21 by a conversion rate of one bit per one clock. Consequently, the transmitting digital signal DX2 including data X11, X21, ....., to which the transmitting analog signal AR is converted, is transmitted through a transmission line, and the received analog signal AR is obtained from the received digital signal DR2 including data R11, R21, ..... which is received from a transmission line.

Then, the frame synchronous signal F23 and the unchanged clock signal C22 are supplied from the control circuit 1 to the decoder 2 and the encoder 3, so that the received digital signal DR2 including data R12, R22, ..... is converted in the same manner as above to the received analog signal AR, and the transmitting analog signal AX is converted in the same manner as above to the transmitting digital signal DX2 including data X12, X22 ..... .

As described above, the external frame synchronous and clock signals F1 and C1 are converted to the internal frame synchronous signal F2 such as F21, F22, F23, ..... and the internal clock signals C2 such as C21, C22, ..... in accordance with data timing and data length of the received and transmitting digital signals DR and DX such as DR1, DR2, ..... and DX1, DX2, Therefore, all types of data of received and transmitting digital signals can be encoded and decoded by using a single set of an encoder and a decoder which are the same as the conventional encoder and decoder.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth. For instance, only one of the frame synchronous signal and the clock signal may be controlled to comply with a type of data carried on received and transmitting digital signals.

What is claimed is

1. A codec having controllable frame synchronizing and clocking signals, comprising;
    a decoder for converting a received digital signal to a received analog signal in synchronism with a frame synchronous signal and a clock signal;
    an encoder for converting a transmitting analog signal to a transmitting digital signal in synchronism with said frame synchronous signal and said clock signal; and means for controlling said decoder and said encoder to carry out conversion between digital and analog signals by supplying said frame synchronous signal and said clock signal thereto;

wherein said controlling means is supplied with an external frame synchronous signal, an external clock signal, and a control signal to generate a frame synchronous signal and a clock signal to be supplied to said decoder and said encoder, said control signal representing a timing and/or a frame length of data carried on said received and transmitting digital signals, whereby at least one of said frame synchronous signal and said clock signal are controlled to comply with said timing and/or said frame length.

2. A codec, according to claim 1, wherein:

a rising edge of said frame synchronous signal is controlled to comply with said timing of said data carried on said received and transmitting digital signals by said controlling means, and a frequency and a pulse width of said clock signal are controlled to comply with said frame length of said data carried on said received and transmitting digital signals by said controlling means.

* * * * *